United States Patent Office 2,742,480
Patented Apr. 17, 1956

2,742,480

PREPARATION OF ISONICOTINIC ACID AND ESTERS THEREOF

Abraham Bavley, Brooklyn, Morton Harfenist, Flushing, Wilbur A. Lazier, Kew Gardens, and William M. McLamore, Flushing, N. Y., assignors to Chas. Pfizer & Co., Inc., Brooklyn, N. Y., a corporation of Delaware No Drawing. Application April 1, 1952,
Serial No. 279,946

3 Claims. (Cl. 260—295)

This invention relates to an improved process for preparing isonicotinic acid, and more particularly, to an improved process for converting a 2,6-dihalopyridine-4-carboxylic acid to isonicotinic acid by hydrogenolysis in the presence of a catalyst and recovering the isonicotinic acid in the form of its esters.

It is known that a 2,6-dihalopyridine-4-carboxylic acid, such as 2,6-dichloropyridine-4-carboxylic acid, can be converted to isonicotinic acid by hydrogenolysis in the presence of a hydrogenation catalyst. However, the catalysts heretofore employed for this purpose are in general expensive, necessitating great care in handling to avoid costly losses, or require relatively high ratios of catalyst to reactant, which also increases the cost of employing them.

It has now been found that isonicotinic acid can be prepared in excellent yields and with a minimum of catalyst by hydrogenolysis of a 2,6-dihalopyridine-4-carboxylic acid under superatmospheric pressure and at an elevated temperature in the presence of a Raney nickel catalyst. It has further been found that the isonicotinic acid can be recovered conveniently from the reaction products so produced, by esterification thereof with a lower alkanol to form useful esters of isonicotinic acid which are readily separated in pure form.

The 2,6-dihalopyridine-4-carboxylic acid may be obtained by halogenation of citrazinic acid, a compound well known in the art. The chlorine derivative, or 2,6-dichloropyridine-4-carboxylic acid, is preferred for reasons of economy.

The hydrogenolysis is carried out in aqueous alkaline solution, which also can contain such water-miscible solvents as ethanol and the like. The 2,6-dihalopyridine-4-carboxylic acid, which can be present in concentrations far above those hitherto employed, is solubilized by use of an alkaline material, such as an alkaline earth or alkali metal hydroxide, preferably sodium hydroxide, in an amount sufficient to form the corresponding metal salt. An additional amount of the alkaline material is employed to maintain the reaction mixture under alkaline conditions throughout the hydrogenolysis, thereby taking up the hydrogen halide which is split off and preserving the activity of the catalyst. A total amount of three equivalents of the alkaline material per equivalent of 2,6-dihalopyridine-4-carboxylic acid is preferred to accomplish both purposes. Thus, in the case of sodium hydroxide, about three mols of sodium hydroxide to one mol of 2,6-dihalopyridine-4-carboxylic acid are employed for optimum results. With substantially larger or smaller amounts of the alkaline material, the catalyst activity appears to become reduced, a factor which may adversely affect the yield of isonicotinic acid, depending upon the quantity and activity of the catalyst used. However, when the preferred quantity of alkaline material is employed, it has been found possible to effect the hydrogenolysis with much less catalyst than would otherwise be necessary, thereby providing substantial savings in cost.

After the 2,6-dihalopyridine-4-carboxylic acid has been dissolved, the nickel catalyst is added to the solution in preparation for the hydrogenolysis. The catalyst which has been found to be particularly effective for the reaction is that known as Raney nickel, which is prepared by treating an alloy of aluminum and nickel in finely divided form with an alkali to dissolve out the aluminum, leaving the nickel in a porous and highly active state. Relatively large ratios of catalyst to the 2,6-dihalopyridine-4-carboxylic acid can be employed successfully, an amount of catalyst equal to or greater than the amount of 2,6-dihalopyridine-4-carboxylic acid being quite effective. However, it has been found that excellent yields can be obtained with as little nickel as 10 percent by weight of the 2,6-dihalopyridine-4-carboxylic acid on a dry basis, when using approximately 3 equivalents of alkaline material per equivalent of 2,6-dihalopyridine-4-carboxylic acid.

The hydrogenolysis is carried out within the temperature range of 50 to 125° C. and at a pressure from 400 to 1000 pounds of hydrogen per square inch. The time of reaction may vary considerably, depending upon the reaction conditions, etc., but in general, from about 2 to 7 hours is sufficient to complete the conversion to isonicotinic acid. The reaction is terminated when approximately 2 mols of hydrogen have been reacted per mol of 2,6-dihalopyridine-4-carboxylic acid. Care should be taken to avoid extreme conditions, since saturaton of the ring might occur.

Upon completion of the hydrogenolysis, the catalyst is filtered off, and the filtrate can be treated by known methods to obtain isonicotinic acid. However, while it is possible to recover the isonicotinic acid by conventional methods of separation, there are certain difficulties involved. For example, when the filtrate is acidified with a suitable acid, such as hydrochloric acid, to dispose of any excess alkali and release the isonicotinic acid, the isonicotinic acid does not readily crystallize out of solution or such crystallization as occurs is incomplete. Nevertheless, it has been found that the isonicotinic acid can conveniently be removed from the acidified solution by formation of an ester thereof with a lower alkanol, followed by separation of the ester by distillation. When an ester is desired, such a procedure results in higher yields than can be obtained by first separating the isonicotinic acid, since all of the isonicotinic acid present in the solution is made available for esterification. Moreover, the esters are purified more readily and more economically than the solid isonicotinic acid. The esters so produced can be used as such or reconverted to isonicotinic acid by known methods.

Before esterification, the water should be removed from the reaction mixture obtained in the hydrogenation step. This can be accomplished by evaporation and/or azeotropic distillation with suitable solvents, such as hydrocarbons, the higher ketones, and the like. Thereafter, the proper alkanol is added to prepare the desired ester. Suitable alkanols include methyl, ethyl, propyl and butyl alcohol. An esterification catalyst, such as dry hydrogen chloride gas or sulfuric acid, is then added and the mixture refluxed for about two to five hours until the esterification is complete. The excess alcohol is then removed under reduced pressure, leaving a solid residue from which the desired ester is readily separated in pure form by neutralization, solvent extraction and distillation.

The invention is further illustrated by the following examples:

Example I

Ten gms. (0.052 mol) of 2,6-dichloropyridine-4-carboxylic acid were dissolved in 200 cc. of dilute sodium hydroxide solution containing 14.8 gms. (0.37 mol) sodium hydroxide. About 20 gms. of Raney nickel catalyst were then added to form a suspension, which was transferred to a 300 cc. hydrogenation bomb. Hydrogen was then introduced at a pressure of 500 lbs. per square inch, and the bomb shaken for a period of four hours, while maintaining a temperature between 46 and 67° C. The pressure fell within 1½ hours to 210 pounds per square inch and stayed constant for the remainder of the four hour period. Upon cooling overnight, the pressure dropped to 160 pounds per square inch, giving a total pressure drop of 340 pounds per square inch which indicated that 2 mols of hydrogen per mol of 2,6-dichloropyridine-4-carboxylic acid were taken up during the reaction. This was substantiated by running a chloride determination on the resulting product. After filtering off and washing the catalyst with water, the filtrate was acidified to a pH of 6.5 with hydrochloric acid and concentrated to dryness under reduced pressure at about 70° C. The product was further dried by adding a mixture of ethanol and benzene and distilling off the mixture azeotropically under reduced pressure.

Two hundred cc. of ethanol were then added to form a suspension of isonicotinic acid, which was cooled while saturating with an excess of dry hydrogen chloride gas to catalyze the esterification. The mixture was refluxed for a period of about 4½ hours, followed by removal of the excess alcohol under reduced pressure. The solid residue remaining was then taken up in about 200 cc. of water and made slightly alkaline with sodium carbonate, whereupon the ester was released as an oil. After two extractions with chloroform, the yield of crude ester was found to be 87%. Distillation of the crude ester resulted in the pure colorless ethyl ester of isonicotinic acid, having a boiling point of 115° C. at 24 mm. mercury. The amount of ester thus obtained was 5.81 gms., amounting to an overall yield of 74%.

*Example II*

Twenty grams (0.104 mol) of 2,6-dichloropyridine-4-carboxylic acid were dissolved in 100 cc. of sodium hydroxide solution containing 29.6 gms. (0.74 mol) sodium hydroxide. About 4 gms. Raney nickel catalyst were then added, and the mixture subjected to hydrogenolysis in a 300 cc. hydrogenation bomb under an initial hydrogen pressure of 800 pounds per square inch and at a temperature of about 100° C. After 3 hours, the total pressure drop was only about 270 pounds. The addition of a second 4 gm. portion of fresh catalyst to the mixture, followed by further subjection to hydrogen under the same conditions for a period of about 12 hours, resulted in no further appreciable drop in pressure. The total pressure drop of 270 pounds at 100° C. corresponds to a hydrogen uptake of only 0.12 mol, or a conversion of 58 percent to isonicotinic acid.

*Example III*

Forty grams (0.208 mol) of 2,6-dichloropyridine-4-carboxylic acid were dissolved in 200 cc. of sodium hydroxide solution containing 25.8 gms. (0.624 mol) of sodium hydroxide. To this were added 4 gms. of Raney nickel, whereupon the mixture was shaken for 7 hours in a 480 cc. bomb under 800 pounds per square inch hydrogen pressure and at a temperature maintained between 86 and 120° C. Upon cooling, the total pressure drop was found to be 580 pounds per square inch, corresponding to a hydrogen uptake of 0.440 mol. A chloride determination confirmed the fact that conversion was substantially complete.

The isonicotinic acid mixture so produced was acidified, dried, and esterified with ethanol in a manner similar to that described in Example I. After removal of the excess alcohol and neutralization with sodium carbonate, the ester was extracted with chloroform and distilled to give a substantially colorless liquid having a boiling point of 112–113° C. at 22 mm. mercury. The amount of ester thus obtained was 26.3 gms., equivalent to a yield of 83.7 percent.

It can readily be seen from Example I that a high ratio of nickel catalyst to the 2,6-dichloropyridine-4-carboxylic acid resulted in a good yield of isonicotinic acid (and the ethyl ester); even though the hydrogenolysis was carried out in the presence of a large excess of sodium hydroxide. However, when the quantity of catalyst was reduced and a large excess of sodium hydroxide still employed, as in Example II, the hydrogenolysis failed to go to completion. On the other hand, with the preferred quantity of sodium hydroxide used in Example III, that is, 3 mols sodium hydroxide per mol of 2,6-dichloropyridine-4-carboxylic acid, substantially complete hydrogenolysis and excellent yields were obtained, although only 10 percent catalyst by weight of the 2,6-dichloropyridine-4-carboxylic acid was present during the reaction.

Thus, this invention provides an economical and efficient process for preparing isonicotinic acid and its esters without the disadvantages which attend prior art methods. The esters so obtained are useful as intermediates in organic syntheses, particularly in the preparation of isonicotinic acid hydrazide, which has shown utility in the treatment of tuberculosis.

Resort may be had to such modifications and equivalents as fall within the spirit of the invention and the scope of the appended claims.

We claim:

1. A process for preparing isonicotinic acid which comprises subjecting a 2,6-dihalopyridine-4-carboxylic acid in an aqueous medium to hydrogenolysis under superatmospheric pressure and at an elevated temperature, in the presence of a Raney nickel catalyst and about three equivalents of an alkaline material per equivalent of 2,6-dihalopyridine-4-carboxylic acid, and terminating the reaction when approximately two mols of hydrogen have been reacted per mol of 2,6-dihalopyridine-4-carboxylic acid.

2. A process for preparing isonicotinic acid which comprises subjecting 2,6-dichloropyridine-4-carboxylic acid in an aqueous medium to hydrogenolysis under superatmospheric pressure and at a temperature from about 50 to 125° C. in the presence of a Raney nickel catalyst and about three equivalents of an alkaline material per equivalent of the carboxylic acid, and terminating the reaction when approximately two mols of hydrogen have been reacted per mol of 2,6-dichloropyridine-4-carboxylic acid.

3. A process for preparing isonicotinic acid which comprises subjecting an aqueous solution of one mol of 2,6-dichloropyridine-4-carboxylic acid per three mols of sodium hydroxide to hydrogenolysis at a pressure of from about 400 to 1000 pounds per square inch and at a temperature from about 50 to 125° C. in the presence of approximately 10% of a Raney nickel catalyst by weight of the carboxylic acid, and terminating the reaction when approximately two mols of hydrogen have been reacted per mol of 2,6-dichloropyridine-4-carboxylic acid.

References Cited in the file of this patent

UNITED STATES PATENTS 2,280,040    Seibert et al. _____ Apr. 14, 1942

OTHER REFERENCES

Wibaut: "Chem. Abst." (1946), vol. 40, p. 4062.

Wibaut: Recueil des Travaux des Pays-Bas, vol. 63, pp. 141–46 (1946).

Maier-Bode: "Pyridin und Seine Derivative," pp. 227–28 (1934).